J. S. PETERS.
TRANSMISSION GEARING FOR MOTOR VEHICLES.
APPLICATION FILED MAY 10, 1913.

1,084,959.

Patented Jan. 20, 1914.

2 SHEETS—SHEET 1.

Witnesses

Inventor
J. S. Peters
By Victor J. Evans
Attorney

J. S. PETERS.
TRANSMISSION GEARING FOR MOTOR VEHICLES.
APPLICATION FILED MAY 10, 1913.

1,084,959.

Patented Jan. 20, 1914.
2 SHEETS—SHEET 2.

Witnesses
F. A. Ackman Jr.
P. M. Smith

Inventor
J. S. Peters
By Victor J. Evans
Attorney

COLUMBIA PLANOGRAPH CO., WASHINGTON, D. C.

UNITED STATES PATENT OFFICE.

JOHN S. PETERS, OF SCOTTDALE, PENNSYLVANIA, ASSIGNOR OF ONE-HALF TO CHARLES H. LOUCKS, OF SCOTTDALE, PENNSYLVANIA.

TRANSMISSION-GEARING FOR MOTOR-VEHICLES.

1,084,959.  Specification of Letters Patent.  Patented Jan. 20, 1914.

Application filed May 10, 1913. Serial No. 766,774.

*To all whom it may concern:*

Be it known that I, JOHN S. PETERS, a citizen of the United States, residing at Scottdale, in the county of Westmoreland and State of Pennsylvania, have invented new and useful Improvements in Transmission-Gearing for Motor-Vehicles, of which the following is a specification.

This invention relates to transmission gearing for motor vehicles, the object of the invention being to provide a practical and reliable friction transmission gearing for the purpose stated, whereby the friction disk forming one of the elements of the transmission friction gearing is effectively supported, so that it may be moved into and out of driving contact with the friction wheel with which it coöperates.

A further object of the invention is to provide, in connection with friction driving mechanism of the class referred to, means for shifting the friction wheel across the face of the friction driving disk to vary the speed of the machine, and to reverse the direction of rotation of the driving axle of the machine; and also means for moving the friction driving disk into and out of driving engagement with the friction wheel.

With the above and other objects in view, the invention consists in the construction, combination and arrangement of parts, as will be hereinafter more fully described, illustrated in the accompanying drawings, and pointed out in the claims hereunto appended.

Figure 1:
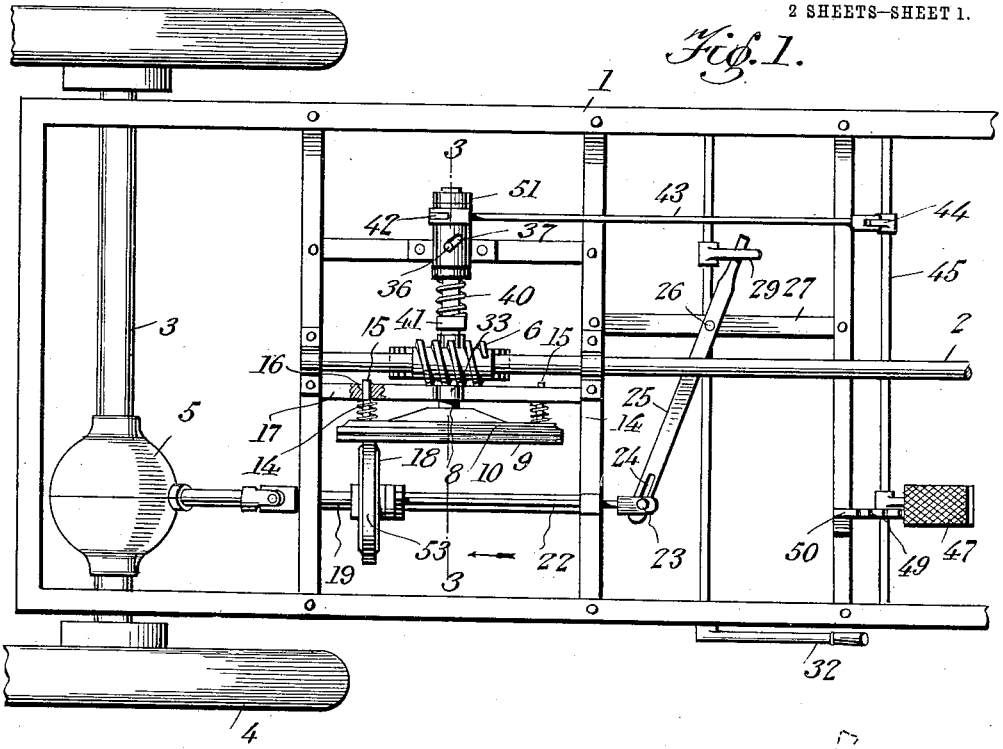
Figure 2:
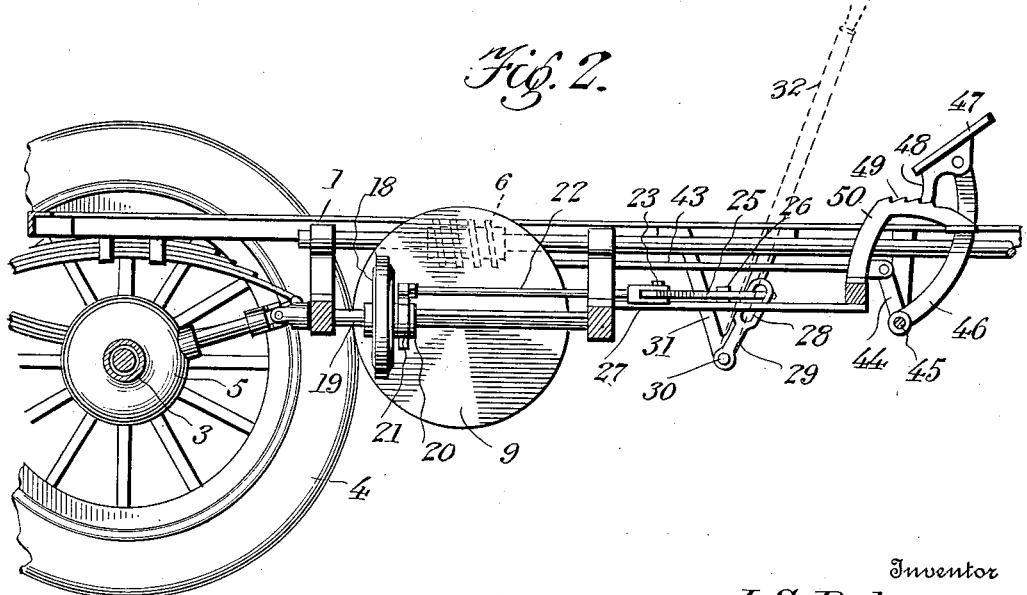
Figure 3:
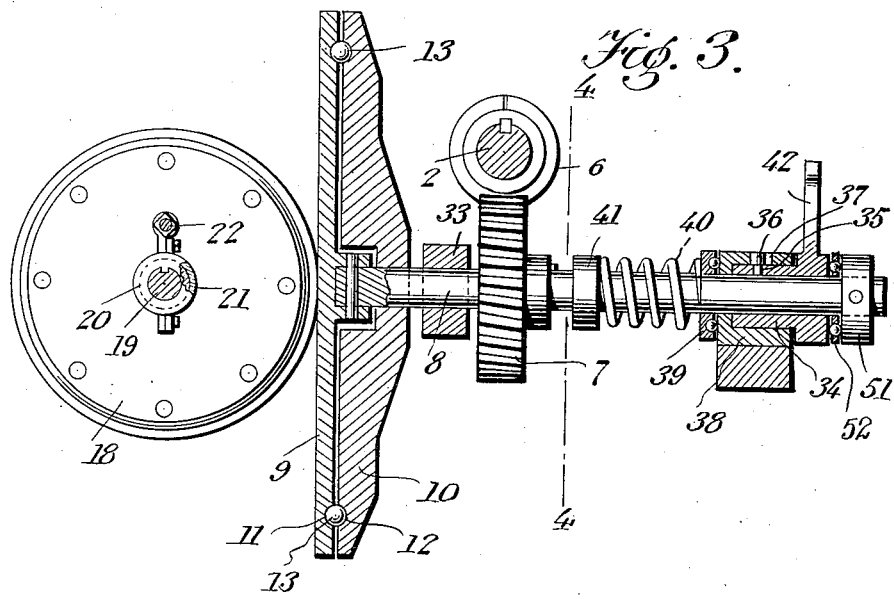
Figure 4:
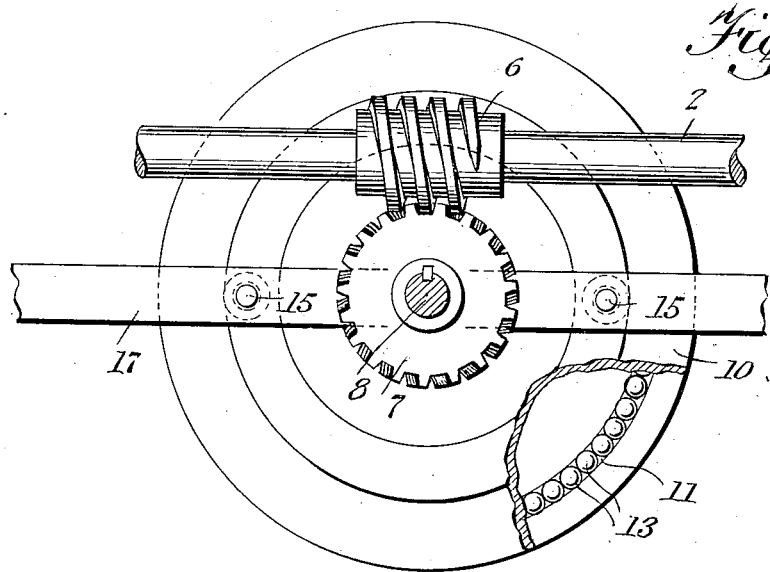

In the drawings: Figure 1 is a plan view partly in section of a sufficient portion of the frame or chassis of an automobile to illustrate the application of the present invention thereto. Fig. 2 is a vertical longitudinal section of the same. Fig. 3 is an enlarged sectional view of the friction transmission gearing showing the transmission shaft, partly in elevation and partly in section. Fig. 4 is an elevation of the same taken at right angles to Fig. 3, looking toward the face of the rotary friction disk and showing the latter partly broken away.

Referring to the drawings, 1 designates the frame or chassis of a mechanically propelled vehicle, 2 the drive shaft which is actuated by the engine (not shown), 3 the driving axle housing, 4 the driving wheels, and 5 the differential casing.

In carrying out the present invention, a worm 6 is keyed or otherwise fastened to the shaft 2, so as to rotate therewith, said worm meshing with and driving a worm wheel 7 which is fast on the transmission shaft 8, said transmission shaft extending substantially at right angles to the drive shaft 2.

On one end of the transmission shaft 8, a rotary friction disk 9 is fastened, as shown in Fig. 3, and just behind the rotary friction disk 9 is a non-rotating sustaining disk 10, the disks 9 and 10 being provided with ball races 11 and 12, respectively, in which is arranged an annular series of anti-friction balls 13 traveling in a path concentric to the axis of movement of the shaft 8 and forming an end thrust anti-friction bearing between the two disks, one of which, as previously indicated, is rotary and the other non-rotating.

The non-rotating disk 10 is supported yieldingly by means of springs 14 which encircle a corresponding number of stems 15 extending laterally away from the non-rotating disk 10 and working through guide openings 16 in the adjacently located frame bar 17, as shown in Fig. 1. These springs serve to sustain the non-rotating disk 10 in position to hold the rotary friction disk 9 in driving contact with a friction wheel 18 which is keyed to a counter shaft 19 extending longitudinally of the machine and geared at its rear end to the differential gearing within the gear case 5, above referred to, said differential gearing being of the ordinary well-known construction now in common use in motor vehicles.

While the friction wheel 18 is keyed to the counter shaft 19 so as to rotate therewith, said friction wheel is shiftable lengthwise of the shaft 19 by the mechanism illustrated in Figs. 1 and 2, wherein it will be noted that the hub 20 of the friction wheel is provided with a groove to receive a fork 21 carried by the rear end of a sliding rod 22 having a pin 23 at its forward end which works in a slot 24 in a wheel shifting lever 25. This lever is fulcrumed, intermediate its ends, at 26, on a frame bar 27 of the machine, and the end of said lever 25 opposite the slotted end 24 is received in the slot 28 of an arm 29 fast on a cross shaft 30 journaled in supporting brackets 31 and having fast thereon an operating hand lever 32. By means of the lever 32 and the connections described, the friction wheel 18 may be shifted across the face of the friction disk 9, so as to vary the speed of the countershaft. Furthermore, by moving the wheel 18 beyond the center of the friction disk 9, the direction of rotation of the counter shaft 19 may be reversed for backing the machine.

The friction disk 9 is also movable into and out of driving contact with the friction wheel 18 by the means illustrated in detail in Fig. 3, in which it will be observed that the transmission shaft 8 is mounted to slide in one or more bearings 33 on the machine frame, carrying with it the friction disk 9 and the worm wheel 7.

34 designates a sleeve having a partially rotative movement around the axis of the shaft 8, and provided with an outwardly extending pin 35 carrying a roller 36 which works in an oblique groove 37 in a thrust sleeve 38 loose on the shaft 8. At the inner side of the thrust sleeve 38 is an end thrust bearing 39, against which presses one end of an expansion spring 40, the opposite end of which bears against a collar 41 fast on the shaft 8, the tension of the spring 40, therefore, being employed to press the friction disk 9 into driving contact with the friction wheel 18.

The sleeve 34 is provided with an arm 42, to which is pivotally connected one end of a rod 43, the opposite end of which is connected pivotally to an arm 44 of a rock shaft 45. This rock shaft has fast thereon a foot lever 46, and the lever 46 is provided at its upper end with a rocking pedal 47 provided with a latch finger 48 which is adapted to engage the teeth 49 of a rack 50 fastened at a suitable point to the machine frame. On its outer end, the shaft 8 is provided with a fixed collar 51, between which and the sleeve 34 is interposed an end thrust bearing 52.

It will now be observed that by means of the lever 46, the sleeve 34 may be turned on the shaft 8 as a center, thereby causing the roller 36 to act in the groove 37 for moving the thrust sleeve 38 toward and away from the counter shaft 19 on which the friction wheel 18 is mounted. The effect of this is to correspondingly move the friction disk 9 into and out of driving contact with the friction wheel 18. When the friction disk is moved out of contact with the wheel 18, the latter may be shifted to any desired extent across the face of the friction disk to change the relative speed of rotation of the shaft 2 and counter shaft 19, and as previously indicated, by shifting the wheel 18 past the center of the friction disk, the counter shaft 19 may be driven in a reverse direction from the shaft 2. The friction wheel 18 may be provided with a tread or face 53 of compressed paper or other material which will impart the necessary frictional qualities to said wheel 18 to prevent relative slipping between the friction disk and friction wheel. The sustaining non-rotating disk 10 is not affected directly by shifting the transmission shaft 8 in the direction of its length, but by reason of the springs 14, said non-rotating disk always follows up the friction disk 9, thereby sustaining said friction disk in driving contact with the friction wheel 18.

While the drawings, for the sake of convenience, illustrate the counter shaft 19 as located to one side of the center of the frame of the machine, it will, of course, be understood that the friction transmission gearing hereinabove described may be so arranged as to be used in conjunction with a centrally located counter shaft leading to centrally arranged differential gearing.

What is claimed is:

1. Friction transmission gearing for motor driven vehicles comprising in combination, a drive shaft, a counter shaft substantially parallel thereto, a transmission shaft substantially at right angles to said drive shaft and counter shaft and geared to the drive shaft, a rotary friction disk fast on the transmission shaft, a yieldingly sustained non-rotating disk forming a supporting abutment for the rotary friction disk, a friction wheel on the counter shaft, means for shifting said friction wheel across the face of the rotary friction disk, and means for moving the rotary friction disk into and out of driving contact with said friction wheel.

2. Friction transmission gearing for motor driven vehicles comprising in combination, a drive shaft, a counter shaft substantially parallel thereto, a transmission shaft substantially at right angles to said drive shaft and counter shaft and geared to the drive shaft, a rotary friction disk fast on the transmission shaft, a non-rotating disk forming a supporting abutment for the rotary friction disk, springs yieldingly sustaining said non-rotating disk, a friction wheel on the counter shaft, means for shifting said friction wheel across the face of the rotary friction disk, and means for moving the rotary friction disk into and out of driving contact with said friction wheel.

3. Friction transmission gearing for motor driven vehicles comprising in combination, a drive shaft, a counter shaft substantially parallel thereto, a transmission shaft substantially at right angles to said drive shaft and counter shaft and geared to the drive shaft, a rotary friction disk fast on the transmission shaft, a yieldingly sustained non-rotating disk forming a supporting abutment for the rotary friction disk, a thrust ball bearing between the rotary and non-rotating disks, a friction wheel on the counter shaft, means for shifting said friction wheel across the face of the rotary friction disk, and means for moving the rotary friction disk into and out of driving contact with said friction wheel.

In testimony whereof I affix my signature in presence of two witnesses.

JOHN S. PETERS.

Witnesses:
 ELIZABETH LAUDENBERGER,
 HARRY LAUGHREY.

Copies of this patent may be obtained for five cents each, by addressing the "Commissioner of Patents, Washington, D. C."